US011025077B2

(12) United States Patent
Yoshikawa (10) Patent No.: US 11,025,077 B2
(45) Date of Patent: Jun. 1, 2021

(54) CHARGING SYSTEM AND METHOD OF CONTROLLING POWER SUPPLY TO TERMINAL

(71) Applicant: NEC Corporation, Tokyo (JP)

(72) Inventor: Masato Yoshikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/918,089

(22) Filed: Mar. 12, 2018

(65) Prior Publication Data

US 2018/0287401 A1    Oct. 4, 2018

(30) Foreign Application Priority Data

Mar. 30, 2017  (JP) .............................. JP2017-068441

(51) Int. Cl.
H02J 7/00       (2006.01)
H02J 7/02       (2016.01)

(52) U.S. Cl.
CPC ............ H02J 7/0047 (2013.01); H02J 7/007 (2013.01); H02J 7/0063 (2013.01); *H02J 7/0042* (2013.01); *H02J 7/0048* (2020.01); *H02J 7/025* (2013.01); *H02J 2007/0067* (2013.01)

(58) Field of Classification Search
CPC ................... H02J 7/0047; H02J 7/0063; H02J 2007/0067; H02J 2007/005; H02J 7/0021; H02J 7/027; H02J 7/1461; H02J 7/166; H02J 7/0025; H02J 7/007; H02J 7/0071; H02J 7/00711; H02J 7/00712; H02J 7/00714; H02J 7/00716; H02J 7/00718; H02J 7/007182; H02J 7/007184; H02J 7/007186; H02J 7/007188; H02J 7/00719; H02J 7/007192; H02J 7/007194; H02J 7/0048; H02J 7/0027; H02J 7/025; H02J 7/0042

See application file for complete search history.

(56) References Cited

U.S. PATENT DOCUMENTS

2014/0151079 A1*  6/2014  Furui ........................ H02J 7/00 173/46
2017/0117736 A1*  4/2017  Katsumata .............. H02J 50/80
2018/0331552 A1* 11/2018  Tsuchiyama .............. G06F 1/28

FOREIGN PATENT DOCUMENTS

JP    2015-144519 A      8/2015
JP    2015144519    *    8/2015    ................ H02J 7/00

* cited by examiner

*Primary Examiner* — Drew A Dunn
*Assistant Examiner* — Sailesh Thapa (57) ABSTRACT

This invention enables to perform charging control independent of a power supply source. A charging device supplies power to a terminal via a cable or wirelessly. The charging device that supplies power to the terminal via a cable or wirelessly includes a remaining battery amount acquirer and a power supply controller. The remaining battery amount acquirer of the charging device that supplies power to the terminal via a cable or wirelessly acquires the remaining battery amount of the terminal. The power supply controller of the charging device that supplies power to the terminal via a cable or wirelessly controls the start and stop of supply of power to the terminal based on the acquired remaining battery amount.

11 Claims, 9 Drawing Sheets

CHARGING SYSTEM AND METHOD OF CONTROLLING POWER SUPPLY TO TERMINAL

CROSS-REFERENCE TO RELATED APPLICATION

This application is based upon and claims the benefit of priority from Japanese patent application No. 2017-068441, filed on Mar. 30, 2017, the disclosure of which is incorporated herein in its entirety by reference.

BACKGROUND OF THE INVENTION

Field of the Invention

The present invention relates to a charging device, a charging method, a charging program, and a charging system.

Description of the Related Art

In the above technical field, patent literature 1 discloses a technique of connecting an on-board device and a smartphone by a USB (Universal Serial Bus) cable and causing a processing unit included in the on-board device serving as a power supply source to control charging of a secondary battery included in the smartphone.

[Patent Literature 1] Japanese Patent Laid-Open No. 2015-144519

SUMMARY OF THE INVENTION

In the technique described in the above literature, however, since the device serving as the power supply source controls charging, charging control independent of the power supply source cannot be performed.

The present invention enables to provide a technique of solving the above-described problem.

One example aspect of the present invention provides a charging device that supplies power to a terminal via a cable or wirelessly, comprising:

a remaining battery amount acquirer that acquires a remaining battery amount of the terminal; and a power supply controller that controls a start and stop of supply of power to the terminal based on the acquired remaining battery amount.

Another example aspect of the present invention provides a charging device that supplies power to a terminal via a cable or wirelessly, comprising:

a receiver that receives an instruction of a start and stop of supply of power; and a power supply controller that controls the start and stop of the supply of power to the terminal based on the acquired instruction.

Still other example aspect of the present invention provides a charging method for supplying power to a terminal via a cable or wirelessly, comprising:

acquiring a remaining battery amount of the terminal; and controlling a start and stop of supply of power to the terminal based on the acquired remaining battery amount.

Still other example aspect of the present invention provides a charging program for supplying power to a terminal via a cable or wirelessly, the charging program causing a computer to execute a method comprising:

acquiring a remaining battery amount of the terminal; and controlling a start and stop of supply of power to the terminal based on the acquired remaining battery amount.

Still other example aspect of the present invention provides a charging system comprising a terminal that receives supply of power, and a charging device that controls the power to be supplied to the terminal, wherein the terminal comprises a notifier that notifies a remaining battery amount, and the charging device comprises:

a remaining battery amount acquirer that acquires the remaining battery amount; and a power supplier that controls a start and stop of the supply of power to the terminal based on the acquired remaining battery amount.

According to the present invention, it is possible to perform charging control independent of the power supply source.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A charging device 100 according to the first example embodiment of the present invention will be described with reference to FIG. 1. The charging device 100 is a device that supplies power to a terminal via a cable or wirelessly.

Figure 1:
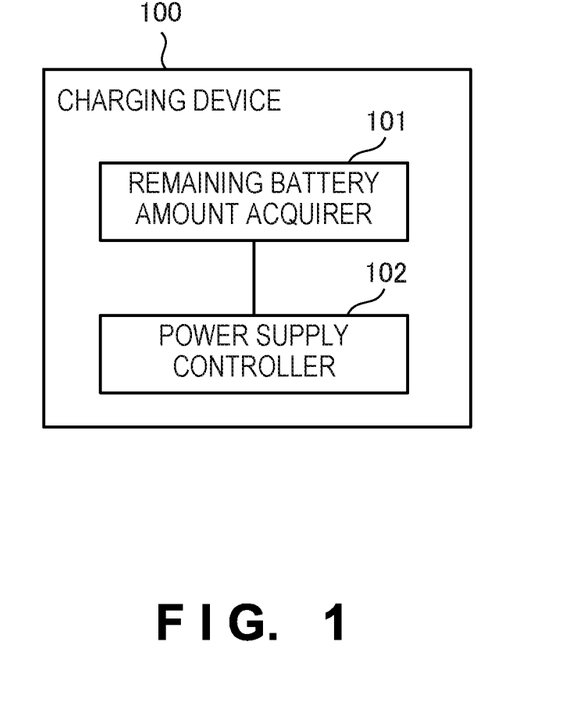
FIG. 1 is a block diagram showing the arrangement of an information processing apparatus according to the first example embodiment of the present invention.

As shown in FIG. 1, the charging device 100 includes a remaining battery amount acquirer 101 and a power supply controller 102. The remaining battery amount acquirer 101 acquires the remaining battery amount of the terminal. The power supply controller 102 controls the start and stop of power supply to the terminal based on the acquired remaining battery amount.

According to this example embodiment, it is possible to perform charging control independent of the power supply source.

Second Example Embodiment

Figure 2:
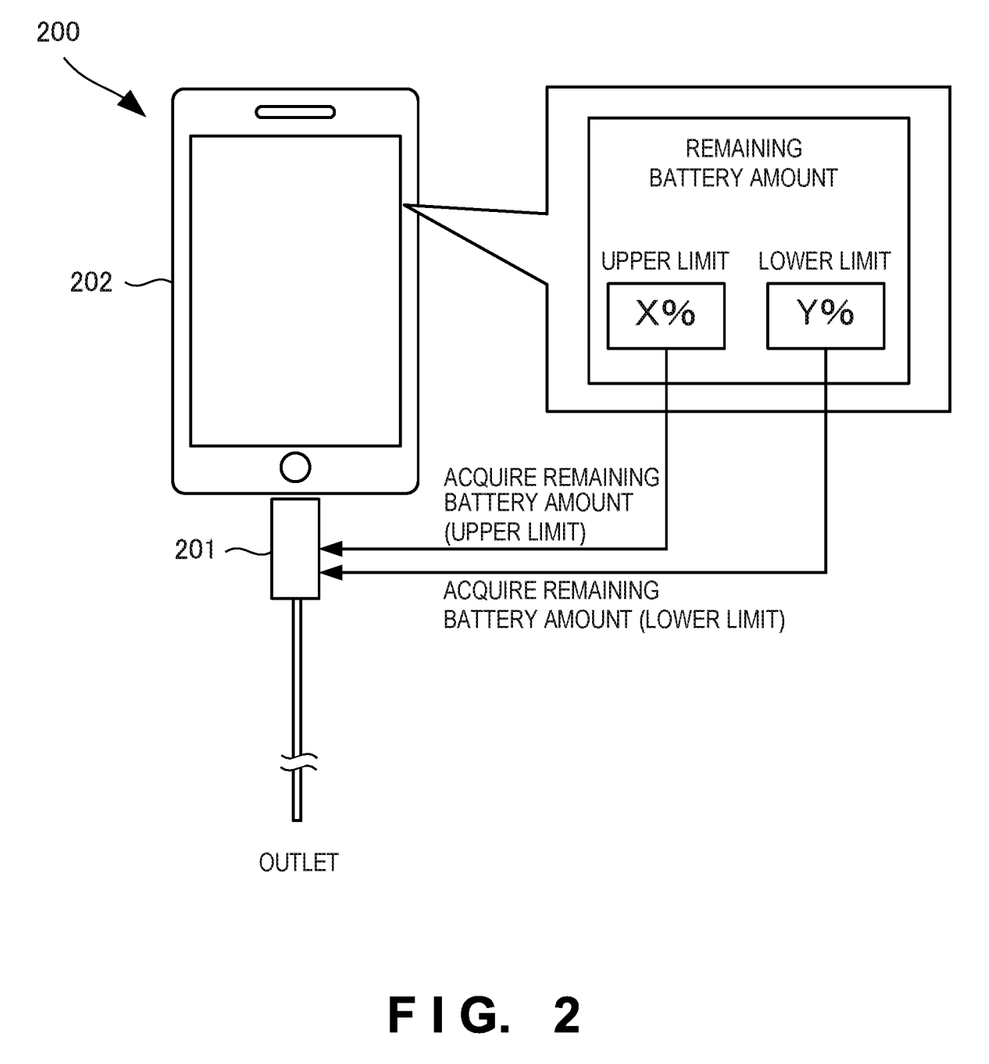
FIG. 2 is a block diagram showing the arrangement of an information processing system according to the second example embodiment of the present invention.

A charging system according to the second example embodiment of the present invention will be described next with reference to FIGS. 2 to 6. FIG. 2 is a block diagram for explaining the arrangement of the charging system according to this example embodiment. A charging system 200 includes a charging device 201 and a terminal 202.

The charging device 201 is a device that is connected to the terminal 202 and supplies power from a power supply to the terminal 202. Here, the charging device 201 is, for example, a USB cable. Hence, the charging device 201 can simultaneously execute power supply and data transfer. The charging device 201 is also connected to the terminal 202 via a connecter terminal and connected to a power supply via an outlet such as an electric outlet, a power supply plug, an attachment plug, or a power outlet.

The terminal 202 includes not only portable terminals such as a smartphone and a tablet but also stationary terminals such as a signage terminal and a simple POS (Point Of Sales) terminal. However, the terminal is not limited to these as long as it is a terminal that needs to charge a battery, an internal battery, or a secondary battery.

The charging device 201 acquires, from the terminal 202, the remaining battery amount of the terminal 202. The charging device 201 controls supply of power from the power supply to the terminal 202 based on the acquired remaining battery amount. For example, if the remaining battery amount of the terminal 202 reaches the upper limit (X %), the charging device 201 stops supplying power to the terminal 202. On the other hand, if the remaining battery amount of the terminal 202 reaches the lower limit (Y %), the charging device 201 starts supplying power to the terminal 202. In this way, the charging device 201 controls supply of power to the terminal 202 so as to prevent battery performance from degrading when the battery of the terminal 202 is fully charged, and charging is continued in the full charge state. This can reduce shortening of the life of the battery mounted in the terminal 202.

Figure 3:
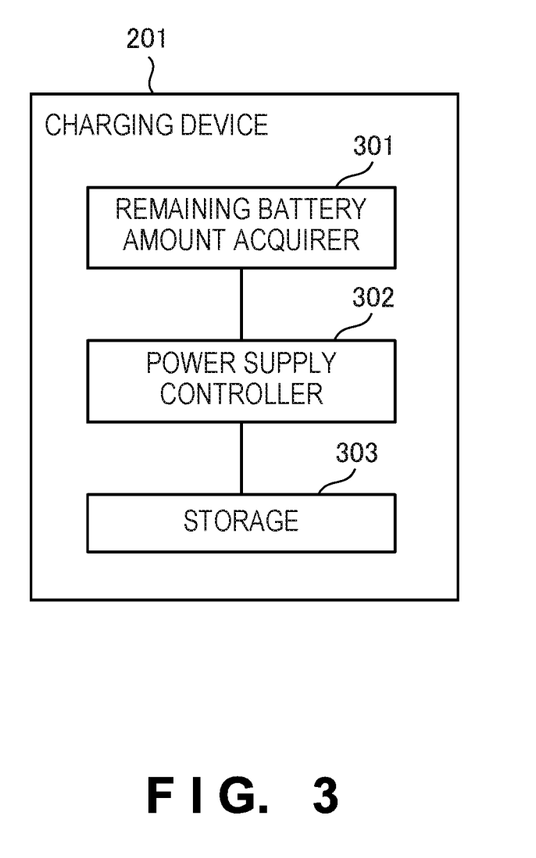
FIG. 3 is a block diagram showing the arrangement of a charging device included in the information processing system according to the second example embodiment of the present invention.

FIG. 3 is a block diagram showing the arrangement of the charging device included in the charging system according to this example embodiment. The charging device 201 includes a remaining battery amount acquirer 301, a power supply controller 302, and a storage 303. The charging device 201 is connected to the terminal 202 via an interface (not shown). The remaining battery amount acquirer 301 acquires, from the terminal 202, the remaining battery amount of the terminal 202.

The power supply controller 302 controls supply of power to the terminal 202 based on the first threshold (for example, the upper limit) and the second threshold (for example, the lower limit) of the remaining battery amount. For example, the power supply controller 302 compares the remaining battery amount of the terminal 202 with the upper limit and the lower limit. If the remaining battery amount of the terminal 202 reaches the upper limit, the power supply controller 302 stops supplying power to the terminal 202 so the power is not supplied to the battery of the terminal 202 anymore.

On the other hand, if the remaining battery amount of the terminal 202 reaches the lower limit, the power supply controller 302 starts supplying power to the terminal 202 to charge the battery of the terminal 202. For example, if the upper limit of the remaining battery amount is set to 90%, and the lower limit is set to 80%, the terminal 202 is charged when the remaining battery amount exists between 90% and 80%. When the remaining battery amount of the terminal 202 reaches 90%, the power supply controller 302 stops supply of power. As a result, the remaining battery amount of the terminal 202 decreases. When the remaining battery amount reaches 80% as the lower limit, the power supply controller 302 starts supply of power, and resumes charging for the terminal 202. When the remaining battery amount reaches 90% again, the power supply controller 302 stops supply of power. Note that an example in which the start and stop of power supply are controlled based on the two, upper and lower limit values of the remaining battery amount has been described here. However, the start and stop of power supply may be controlled variously based on various values of the remaining battery amount.

The storage 303 stores, for example, the threshold of the remaining battery amount of the terminal 202 used to control the start and stop of supply of power. The power supply controller 302 compares the threshold of the remaining battery amount stored in the storage 303 with the remaining battery amount (current amount), thereby controlling the start and stop of power supply to the terminal 202. Note that the threshold of the remaining battery amount stored in the storage 303 may be the threshold of the remaining battery amount based on, for example, a date/time, day of week, time, season, use purpose, or user. The power supply controller 302 may control power supply by comparing the remaining battery amount with the threshold of the remaining battery amount according to the date/time or the like.

Figure 4:
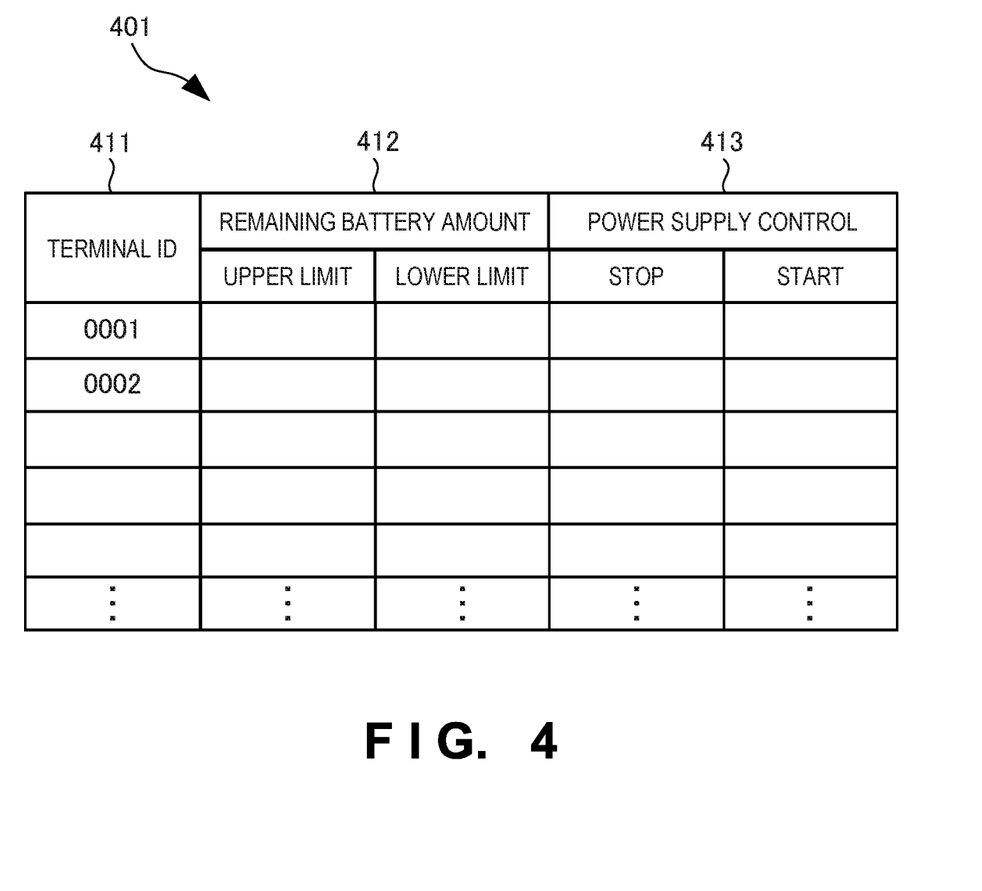
FIG. 4 is a view showing an example of a supply table provided in the charging device included in the information processing system according to the second example embodiment of the present invention.

FIG. 4 is a view showing an example of a supply table provided in the charging device included in the information processing system according to this example embodiment. A supply table 401 stores a remaining battery amount 412 and power supply control 413 in association with a terminal ID (Identifier) 411. The terminal ID 411 is an identifier used to identify the terminal 202 and is uniquely assigned in accordance with, for example, the model of the terminal 202. The remaining battery amount 412 is the remaining amount of the secondary battery of the terminal 202. An upper limit and a lower limit, which serve as the criteria of the start and stop of power supply, are stored. The power supply control 413 is data associated with the conditions of the stop and start of power supply according to the remaining battery amount. The charging device 201 controls the start and stop of power supply to the terminal 202 by referring to, for example, the supply table 401.

Figure 5:
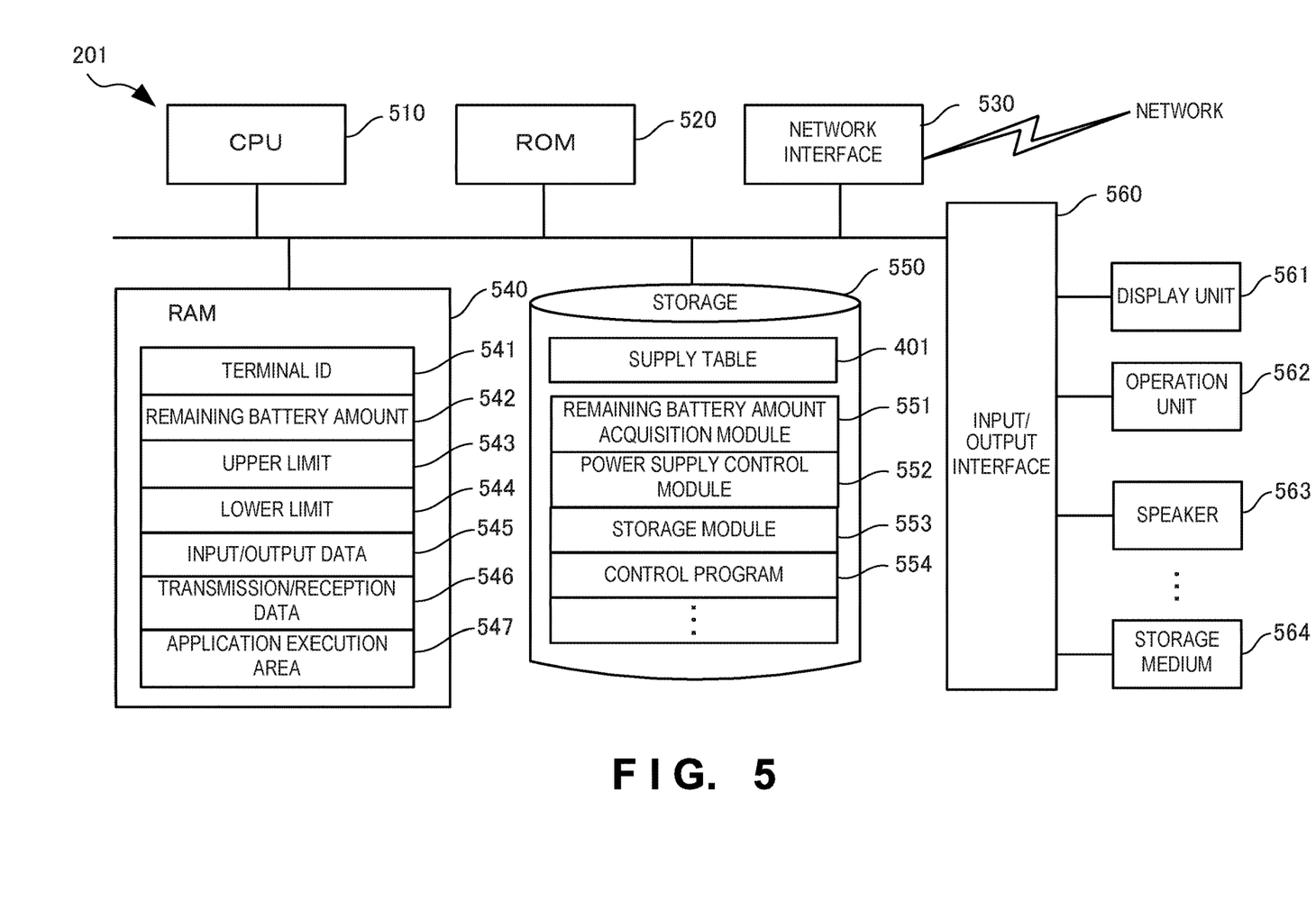
FIG. 5 is a block diagram showing the hardware arrangement of the charging device included in the information processing system according to the second example embodiment of the present invention.

FIG. 5 is a block diagram for explaining the hardware arrangement of the charging device 201 included in the information processing system according to this example embodiment. A CPU (Central Processing Unit) 510 is a processor for arithmetic control. The CPU 510 executes a program, thereby implementing the functional components of the charging device 201 shown in FIG. 3. The CPU 510 may include a plurality of processors and execute different programs, modules, tasks, or threads in parallel. A ROM (Read Only Memory) 520 stores permanent data such as initial data and a program, and other programs. A network interface 530 communicates with another device or the like via a network. Note that the CPU 510 is not limited to one CPU and may include a plurality of CPUs or a GPU (Graphics Processing Unit) for image processing. The network interface 530 preferably includes a CPU independent of the CPU 510 and writes or reads transmission/reception data to or from an area of a RAM (Random Access Memory) 540. In addition, a DMAC (Direct Memory Access Controller) (not shown) that transfers data between the RAM 540 and a storage 550 is preferably provided. Furthermore, an input/output interface 560 preferably includes a CPU independent of the CPU 510 and writes or reads input/output data to or from an area of the RAM 540. Hence, the CPU 510 recognizes data reception by the RAM 540 or data transfer to the RAM 540 and processes the data. The CPU 510 also prepares a processing result in the RAM 540, and leaves subsequent transmission or transfer to the network interface 530, the DMAC, or the input/output interface 560.

The RAM 540 is a random access memory used by the CPU 510 as a work area for temporary storage. An area to store data necessary for implementation of the example embodiment are stored in the RAM 540. A terminal ID 541 is data used to identify the terminal 202 as a power supply target. A remaining battery amount 542 is data representing the remaining amount of the battery of the terminal 202. An upper limit 543 is the data of the remaining battery amount to stop power supply. A lower limit 544 is the data of the remaining battery amount to start power supply. These data and the pieces of information are loaded from, for example, the supply table 401.

Input/output data 545 is data input/output via the input/output interface 560. Transmission/reception data 546 is data transmitted/received via the network interface 530. In addition, the RAM 540 includes an application execution area 547 used to execute various kinds of application modules.

The storage 550 stores a database, various kinds of parameters, or following data or program necessary for implementation of the example embodiment. The storage 550 stores the supply table 401. The supply table 401 is a table that manages the relationship between the terminal ID 411 and the power supply control 413 shown in FIG. 4.

The storage 550 further stores a remaining battery amount acquisition module 551, a power supply control module 552, and a storage module 553.

The remaining battery amount acquisition module 551 is a module that acquires the remaining battery amount of the terminal 202. The power supply control module 552 is a module that controls the start and stop of power supply to the terminal 202 based on the remaining battery amount. The storage module 553 is a module that stores the upper limit and the lower limit of the remaining battery amount of the terminal 202, which serve as the criteria of power supply. The modules 551 to 553 are loaded to the application execution area 547 of the RAM 540 and executed by the CPU 510. A control program 554 is a program configured to control the entire charging device 201.

Note that the charging device 201 may include the following components, as needed. The input/output interface 560 interfaces input/output data for an input/output device. A display unit 561 and an operation unit 562 are connected to the input/output interface 560. A storage medium 564 may further be connected to the input/output interface 560. A speaker 563 serving as a voice output unit, a microphone (not shown) serving as a voice input unit, or a GPS position determiner may further be connected. Note that as for the RAM 540 and the storage 550 shown in FIG. 5, programs and data concerning the general-purpose functions or other implementable functions of the charging device 201 are not illustrated.

Figure 6A:
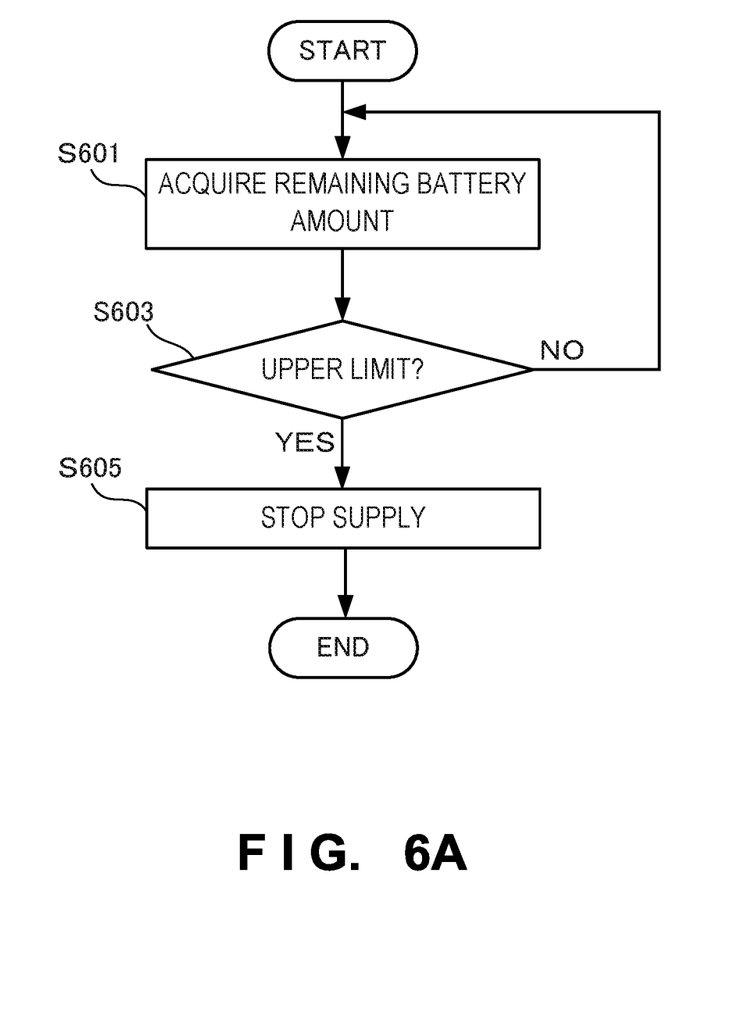
FIG. 6A is a flowchart for explaining a processing procedure of the charging device included in the information processing system according to the second example embodiment of the present invention.

FIG. 6A is a flowchart for explaining a processing procedure of the charging device 201 according to this example embodiment. This flowchart is executed by the CPU 510 shown in FIG. 5 using the RAM 540 and implements the functional components of the charging device 201 shown in FIG. 3.

In step S601, the charging device 201 acquires the remaining battery amount. In step S603, the charging device 201 determines whether the remaining battery amount reaches the first threshold (upper limit). If the remaining battery amount does not reach the upper limit (NO in step S603), the charging device 201 returns to step S601. If the remaining battery amount reaches the upper limit (YES in step S603), the charging device 201 advances to step S605. In step S605, the charging device 201 stops supplying power to the terminal 202.

Figure 6B:
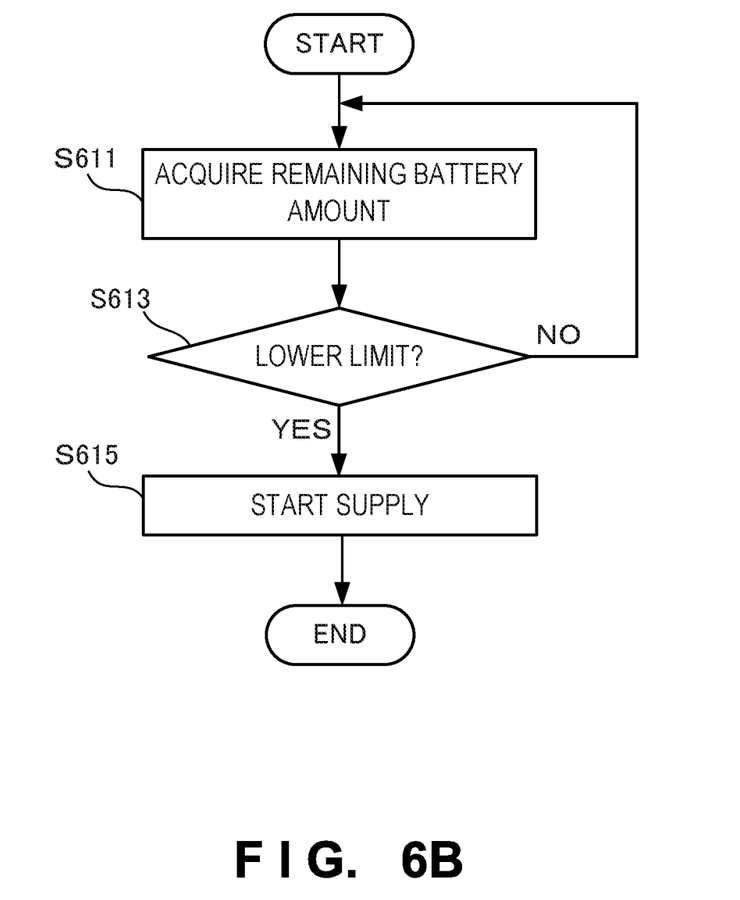
FIG. 6B is a flowchart for explaining another processing procedure of the charging device included in the information processing system according to the second example embodiment of the present invention.

FIG. 6B is another flowchart for explaining the processing procedure of the charging device 201 according to this example embodiment. This flowchart is executed by the CPU 510 shown in FIG. 5 using the RAM 540 and implements the functional components of the charging device 201 shown in FIG. 3.

In step S611, the charging device 201 acquires the remaining battery amount. In step S613, the charging device 201 determines whether the remaining battery amount reaches the second threshold (lower limit). If the remaining battery amount does not reach the lower limit (NO in step S613), the charging device 201 returns to step S611. If the remaining battery amount reaches the lower limit (YES in step S613), the charging device 201 advances to step S615. In step S615, the charging device 201 starts supplying power to the terminal 202.

According to this example embodiment, it is possible to perform charging control independent of the power supply source. It is also possible to reduce shortening of the life of the battery mounted in the terminal. Additionally, according to this example embodiment, since the power supply to the terminal is automatically controlled, the user of the terminal need not insert/remove the charging cable while confirming the remaining battery amount.

Third Example Embodiment

Figure 7:
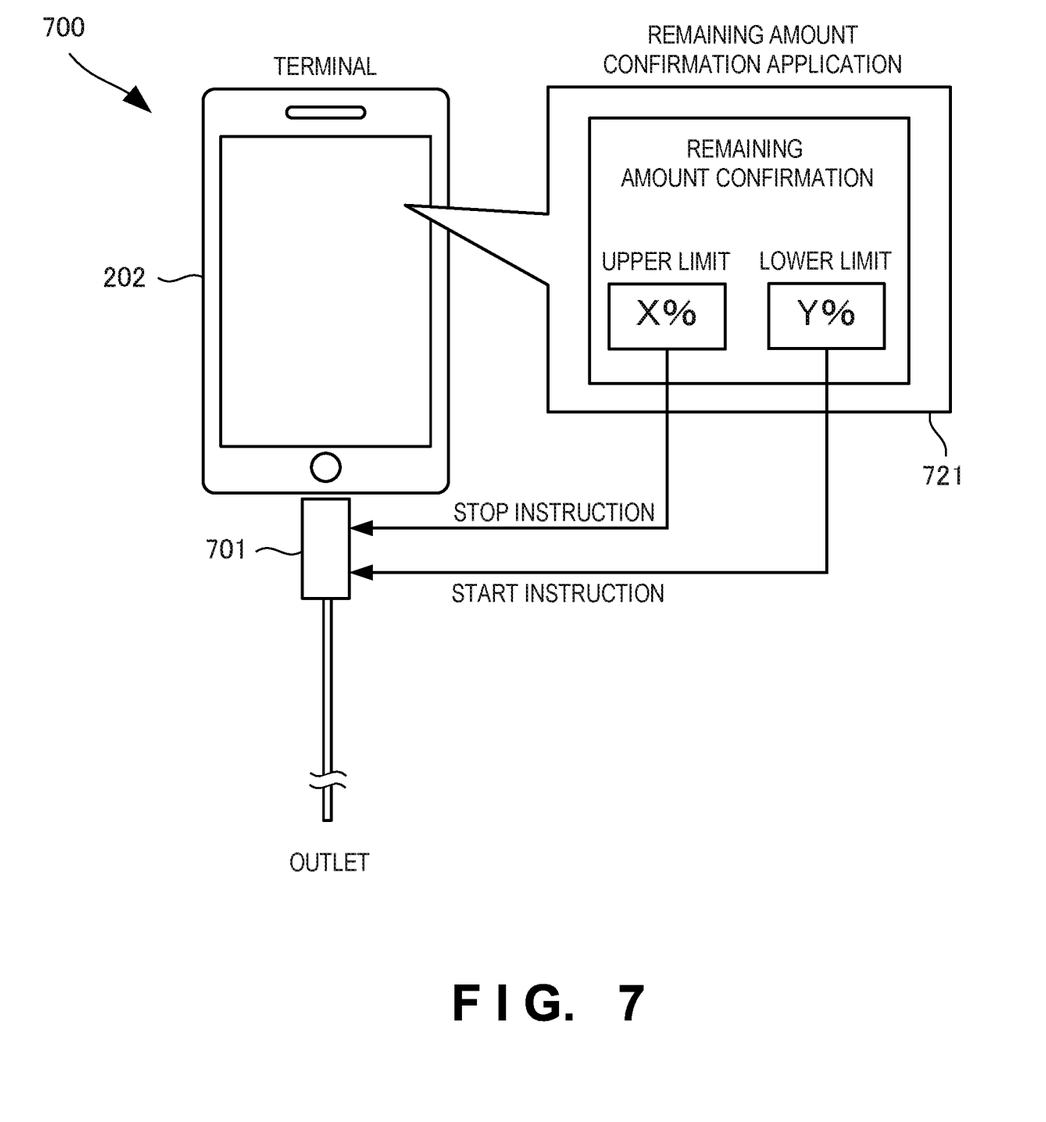
FIG. 7 is a block diagram showing the arrangement of an information processing system according to the third example embodiment of the present invention.

A charging system according to the third example embodiment of the present invention will be described next with reference to FIG. 7. FIG. 7 is a block diagram for explaining the arrangement of the charging system according to this example embodiment. The charging system according to this example embodiment is different from the second example embodiment in that an application installed in the terminal controls the start and stop of power supply. The rest of the components and operations is the same as in the second example embodiment. Hence, the same reference numerals denote the same components and operations, and a detailed description thereof will be omitted.

A charging system 700 includes a charging device 701 and a terminal 202. A remaining amount confirmation application 721 is installed in the terminal 202. The remaining amount confirmation application 721 acquires the remaining battery amount of the terminal 202 and compares the acquired remaining battery amount with predetermined thresholds, for example, the upper limit and the lower limit of the remaining battery amount. If the remaining battery amount reaches the upper limit, the remaining amount confirmation application 721 sends a power supply stop instruction to the charging device 701. If the remaining battery amount reaches the lower limit, the remaining amount confirmation application 721 sends a power supply start instruction to the charging device 701.

Note that an example in which the remaining amount confirmation application 721 compares the remaining battery amount of the terminal 202 with the upper limit and the lower limit has been described here. However, for example, the remaining amount confirmation application 721 may notify the charging device 701 of the acquired remaining battery amount of the terminal 202. Then, the charging device 701 notified of the remaining battery amount may compare the remaining battery amount of the terminal 202 with the upper limit and the lower limit.

Upon receiving the instruction from the remaining amount confirmation application 721, the charging device 701 controls the start and stop of power supply to the terminal 202 in accordance with the instruction from the remaining amount confirmation application 721. Note that the upper limit and the lower limit of the remaining battery amount may be set or changed by the user of the terminal 202 using the remaining amount confirmation application 721. When the remaining amount confirmation application 721 sets the set or changed upper limit and lower limit of the remaining battery amount in the charging device 701, the input by the user can be reflected on the charging device 701.

According to this example embodiment, since the instruction of the start and stop of power supply is input from the application installed in the terminal, more flexible power supply control can be done by changing the contents of the application. Additionally, since the user of the terminal need only install the application, shortening of the battery life can be reduced by a simple method.

Fourth Example Embodiment

Figure 8:
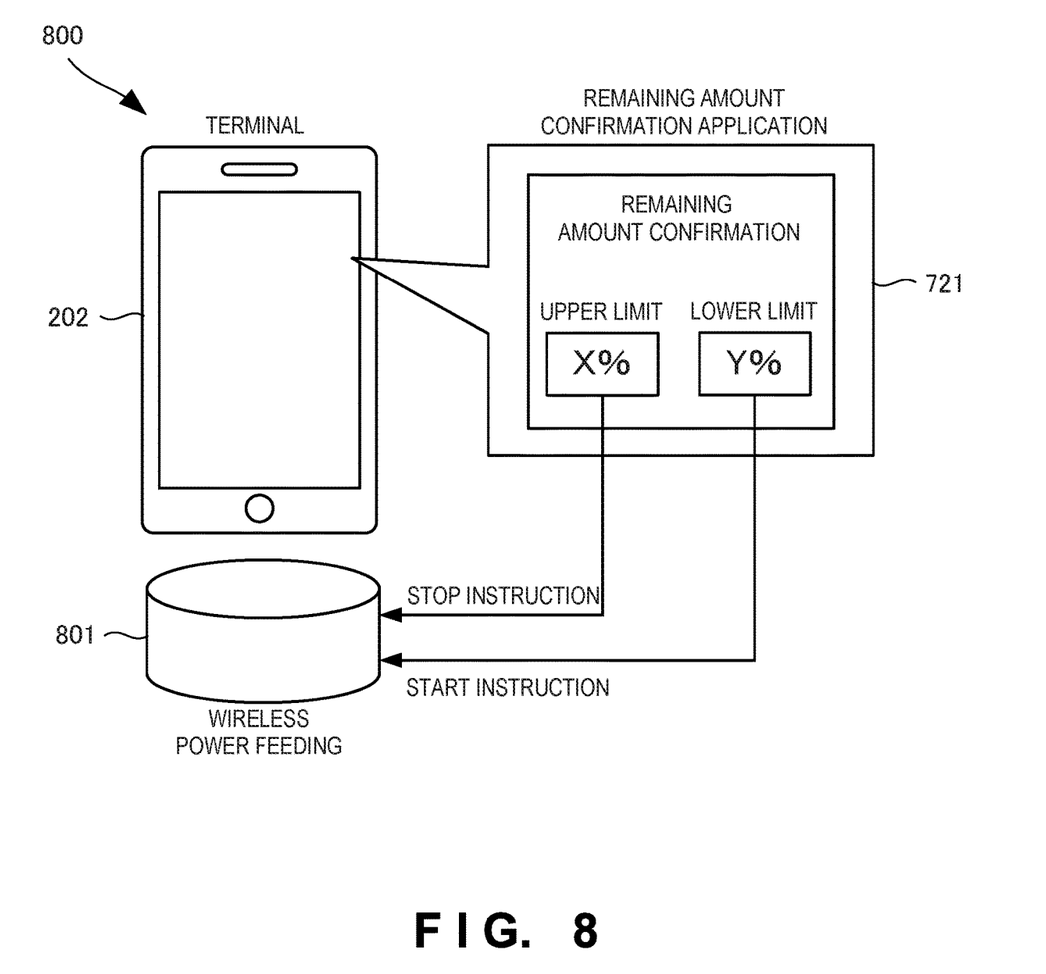
FIG. 8 is a block diagram showing the arrangement of an information processing system according to the fourth example embodiment of the present invention.

A charging system according to the fourth example embodiment of the present invention will be described next with reference to FIG. 8. FIG. 8 is a block diagram for explaining the arrangement of the charging system according to this example embodiment. The charging system according to this example embodiment is different from the third example embodiment in that a charging device performs not wired power feeding but wireless power feeding. The rest of the components and operations is the same as in the third example embodiment. Hence, the same reference numerals denote the same components and operations, and a detailed description thereof will be omitted.

A charging system 800 includes a charging device 801 and a terminal 202. The charging device 801 supplies power to the terminal 202 by wireless power feeding to charge the battery of the terminal 202. The charging device 801 receives an instruction of the start and stop of power supply from a remaining amount confirmation application 721, and controls the start and stop of power supply in accordance with the instruction.

According to this example embodiment, even in wireless power feeding, charging control independent of the power supply source can be performed. Additionally, as in the third example embodiment, since the instruction of the start and stop of power supply is input from the application installed in the terminal, more flexible power supply control can be done by changing the contents of the application. Furthermore, in the wireless power feeding as well, the user of the terminal can reduce shortening of the battery life by a simple method.

Other Example Embodiments

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. A charging device that supplies power to a terminal, comprising:
   a remaining battery amount acquirer that acquires a remaining battery amount of the terminal from the terminal; and
   a power supply controller that controls a start and stop of supply of power to the terminal based on the acquired remaining battery amount, a first threshold and a second threshold less than the first threshold,
   wherein if the acquired remaining battery amount reaches the second threshold, said power supply controller starts the supply of power to the terminal, and if the acquired remaining battery amount reaches the first threshold, said power supply controller stops the supply of power to the terminal, and
   wherein a set of the first and second thresholds is selected from plural sets of first and second thresholds in accordance with a model of the terminal.

2. The charging device according to claim 1, wherein the charging device supplies power to the terminal wirelessly.

3. The charging device according to claim 1, further comprising a supply table that stores the plural sets of first and second thresholds in accordance with identifiers of a plurality of terminals, respectively, and
   wherein said power supply controller controls the start and stop of supply of power to the terminal in reference to the supply table.

4. The charging device according to claim 1, wherein the first threshold and the second threshold are set based on a date/time, day of week, time, season, use purpose, or user.

5. The charging device according to claim 1, wherein said power supply controller controls the start and stop of the supply of power based on the first threshold and the second threshold which have been transmitted in advance from the terminal to the charging device.

6. The charging device according to claim 5, wherein the first threshold and the second threshold have been input to the terminal by a user.

7. A charging method of a charging device for supplying power to a terminal, comprising:

acquiring a remaining battery amount of the terminal from the terminal; and controlling a start and stop of supply of power to the terminal based on the acquired remaining battery amount, a first threshold and a second threshold less than the first threshold, wherein if the acquired remaining battery amount reaches the second threshold, the supply of power to the terminal is controlled to start, and if the acquired remaining battery amount reaches the first threshold, the supply of power to the terminal is controlled to stop, and wherein a set of the first and second thresholds is selected from plural sets of first and second thresholds in accordance with a model of the terminal.

8. A non-transitory computer readable medium storing a charging program of a charging device for supplying power to a terminal, the charging program causing a computer to execute a method comprising:

acquiring a remaining battery amount of the terminal from the terminal; and controlling a start and stop of supply of power to the terminal based on the acquired remaining battery amount, a first threshold and a second threshold less than the first threshold, wherein if the acquired remaining battery amount reaches the second threshold, the supply of power to the terminal is controlled to start, and if the acquired remaining battery amount reaches the first threshold, the supply of power to the terminal is controlled to stop, and wherein a set of the first and second thresholds is selected from plural sets of first and second thresholds in accordance with a model of the terminal.

9. A charging system comprising a terminal that receives supply of power, and a charging device that controls the power to be supplied to said terminal, wherein said terminal notifies the charging device of a remaining battery amount of the terminal, and said charging device comprises:

a remaining battery amount acquirer that acquires the remaining battery amount from the terminal; and a power supply controller that controls a start and stop of supply of power to the terminal based on the acquired remaining battery amount, a first threshold and a second threshold less than the first threshold, wherein if the acquired remaining battery amount reaches the second threshold, said power supply controller starts the supply of power to the terminal, and if the acquired remaining battery amount reaches the first threshold, said power supply controller stops the supply of power to the terminal, and wherein a set of the first and second thresholds is selected from plural sets of first and second thresholds in accordance with a model of the terminal.

10. A charging system comprising a terminal that receives supply of power, and a charging device that controls the power to be supplied to said terminal, wherein said terminal comprises:

a remaining battery amount acquirer that acquires a remaining battery amount of the terminal;

a power supply instructor that sends, to the charging device, an instruction of a start and stop of supply of power to the terminal generated based on the acquired remaining battery amount, a first threshold and a second threshold less than the first threshold, wherein if the acquired remaining battery amount reaches the second threshold, said power supply instructor sends, to the charging device, an instruction of the start of the supply of power to the terminal, and if the acquired remaining battery amount reaches the first threshold, said power supply instructor sends, to the charging device, an instruction of the stop of the supply of power to the terminal, and wherein the first and second thresholds have been input to the terminal by a user, and said charging device comprises:

a receiver that receives the instruction of the start and stop of supply of power from the terminal; and a power supply controller that controls the start and stop of the supply of power to the terminal based on the received instruction.

11. The charging system according to claim 10, wherein the charging device supplies the power to the terminal wirelessly.

* * * * *